United States Patent [19]

Ojeda

[11] 4,219,606

[45] Aug. 26, 1980

[54] CHEMICAL COMPOSITION FOR THE COATING OF ELECTRODES FOR MANUAL ARC WELDING

[76] Inventor: Ariel G. Ojeda, 260, Calzada St., Vedado, Havana, Cuba

[21] Appl. No.: 965,307

[22] Filed: Nov. 29, 1978

[51] Int. Cl.$^2$ ................... B32B 15/04; C08L 1/00; C08L 5/00
[52] U.S. Cl. ................................... 428/386; 106/162; 106/204; 252/520
[58] Field of Search ............... 106/162, 204, 286.4; 252/520; 428/386

[56] References Cited

U.S. PATENT DOCUMENTS

| | | | |
|---|---|---|---|
| 1,911,054 | 5/1933 | Brophy | 428/387 |
| 2,697,159 | 12/1954 | Donahey | 428/386 |
| 3,849,189 | 11/1974 | Yarovinsky | 252/520 |

OTHER PUBLICATIONS

Chem. Abst. 60:15,562c.

*Primary Examiner*—Theodore Morris
*Attorney, Agent, or Firm*—Haseltine, Lake & Waters

[57] ABSTRACT

The coating composition consists essentially of, by weight, 6–20% cane bagasse, 10–15% potassic feldspar, 40–50% rutile concentrate, 8–12% calcium carbonate, 10–12% ferromanganese and 10–13% potassic mica, wherein the potassic feldspar has the following composition:

| | |
|---|---|
| $SiO_2$ | 65–75% |
| $Al_2O_3$ | 10–15% |
| $Fe_2O_3$ | 1–2% |
| CaO | 1–1.5% |
| $Na_2O$ | 4–10% |
| $K_2O$ | 4–12% |
| $TiO_2$ | 1–3% |

2 Claims, No Drawings

CHEMICAL COMPOSITION FOR THE COATING OF ELECTRODES FOR MANUAL ARC WELDING

BACKGROUND OF THE INVENTION

The proposed invention is in the field of arc welding and can be used in all branches of the industry for welding low-alloyed steels.

Chemical compositions employed as coatings for electrodes used in arc welding are very diversified, as each country tries to use its own raw materials as much as possible. Generally the coating must contain arc stabilizing materials, gas formers, slag formers and ferroalloys. Known are the rutile electrodes of the German Democratic Republic which contain: rutile, cellulose, mica, iron powder, kaolin, dolomite, talc, nodular iron and ferromanganese.

They use as arc stabilizing material a high content of rutile and as gas former cellulose, both of which are high in price which increases the cost of the product. The formula of the coating has ten components and this involves more time for preparation and weighing of the components.

The electrodes require a prolonged drying time at ambient temperature, between eight and sixteen hours, to avoid cracks in the coating during complete drying in an electric oven.

SUMMARY OF THE INVENTION

The purpose of the present invention has been to obtain a chemical coating composition with a smaller number of components, thus reducing the operating time of grinding, screening, weighing and dry mixing; the invention reduces the drying time without the occurrence of cracks in the coating, and it replaces some conventional raw materials in the composition of the electrode coating by new components, reducing the coats thereof.

The constitution of the new chemical composition is the following:

| | |
|---|---|
| Bagasse (from sugar cane) | 6–20% |
| Potassic feldspar | 10–15% |
| Rutile concentrate | 40–50% |
| Calcium carbonate | 8–12% |
| Ferromanganese | 10–12% |
| Potassic mica | 18–13% |

The novelty of this invention consists in obtaining a chemical composition for coating the electrodes by using bagasse, potassic feldspar having a high content of ionizing elements (sodium, potassium, titanium) and other components. The bagasse and the potassic feldspar are used in a relatively high proportion, thereby reducing the number of components. The high rutile content which these electrodes conventionally contain has been replaced in part by a high proportion of $Na_2O$ and $K_2O$ which has a function similar to rutile. The conventional cellulose component was replaced by the cane bagasse, whose function is similar, being increased in a proportion of two to three times. With the increased amount of the bagasse it has been possible to considerably reduce the drying time (3–6 hours) at ambient temperature without the occurrence of cracks in the coating of the electrode during the complete drying in the oven at a temperature of 120°–140° C. and a 60% increase in the yield of the mass. Also calcium carbonate may replace the dolomite.

DESCRIPTION OF THE PREFERRED EMBODIMENTS

The potassic feldspar used in the present invention has the following composition:

| | |
|---|---|
| $SiO_2$ | 65–75% |
| $Al_2O_3$ | 10–15% |
| $Fe_2O_3$ | 1–2% |
| $CaO$ | 1–1.5% |
| $Na_2O$ | 4–10% |
| $K_2O$ | 4–12% |
| $TiO_2$ | 1–3% |

Rutile concentrate is a solid mixture of the following components:

| | |
|---|---|
| $TiO_2$ | 35–42% |
| $SiO_2$ | 3–6% |
| $Al_2O_3$ | 4–5.5% |
| $FeO$ | 50–54% |

Potassic mica has the following composition:

| | |
|---|---|
| $SiO_2$ | 43–60% |
| $Al_2O_3$ | 10–20% |
| $Fe_2O_3$ | 6–13% |
| $K_2O$ | 3–6% |

Potassium silicate solution (35°–38° Be, viscosity 80–120 cps, $SiO_2:K_2O=3.2:1$) is used as a binder in the amount of 35–45% based on the weight of the powder mixture.

The technology for making the electrodes is similar to the existing ones, consisting of the following steps:

Chemical analysis of the materials to be used in order to decide on their use or rejection.

Grinding and screening according to the grain size provided for each component.

Weighing of the components according to the coating formula.

Dry mixing of the powders.

The dry-mixed powder is poured into a wet mixer, where liquid potassium silicate binder is added to it in adequate proportion to form the mass, which is subsequently introduced in briquette form into the cylinder of an electrode extrusion press, where the wire and the paste join to form the electrode by a system of nozzles.

After leaving the press, the electrodes are automatically transported to the brush station, where the fastening end and the contact point are cleaned of the coating. Then the electrodes are placed in frames which are transported to the air drying site. After being dried at ambient temperature, they are placed in an electric oven for complete drying, after which they go the the Packing Department.

Tests made show that the replacement of some of the conventional raw materials has not worsened the technical specifications of the electrodes and in some cases, such as arc stability, detachment of slag, losses by scattering and mechanical properties, they are superior to electrodes of other countries with the advantage of a reduced production cost.

The electrode production of the invention is more efficient economically, which is reflected in the following analysis by comparison with the rutile electrode of the German Democratic Republic taken as reference:

| No. | General data | East German Elec. Ti VIII | Electrode of the invention |
|---|---|---|---|
| 1 | Number of components of the formulation | 11 | 7 |
| 2 | Kilograms of electrodes produced with 200 kg of powder | 1,000 | 1,600 |
| 3 | % of yield increase | — | 60 |
| 4 | Cost of the formulation per 1,000 kg of electrode | 38.12 | 22.64 |
| 5 | Cost of 10,000 MT of electrodes | 4,748,400 | 3,900,160 |
| 6 | Saving per 10,000 MT of electrodes | | 848,240.00 |

In order to test the operativeness of the electrode applied to different constructions, a "zero series" of one metric ton of electrodes was manufactured, which was distributed among different plants of the country, positive results being obtained.

On the basis of the results obtained, the following conclusions were arrived at:

1. The analyzed electrodes can be used for welding light low-carbon and low-alloyed steel structures which are subjected to light dynamic loads.

2. The electrodes show very low phosphorus and sulfur contents, and this has a positive effect on their resilience.

3. The technical characteristics of the electrodes of the invention are the following:

Principal data: Type of current, D.C. or A.C.

Recommended current range: Electrode diameter 3 mm: 70–125 amp.

| Yield: | |
|---|---|
| Effective Yield, % | 95.5 |
| Coefficient of deposit g/amp.h | 8.3–9 |
| Melting time in seconds of 1 electrode less 50mm | 58–60 |

| Mechanical properties of the deposited metal and of unions at grade CT3 steel joints | |
|---|---|
| Tensile strength kgf/mm$^2$ | 48–52 |
| Flow kgf/mm$^2$ | 38–41 |
| Elongation % | 24–30 |
| Area reduction % | 50–64 |
| Resilience kgm/cm$^2$ | 12–14 |
| Bending angle | 180° |

| Chemical composition of the deposited material in % | |
|---|---|
| Carbon | 0.09–0.10 |
| Manganese | 0.50–0.75 |
| Silicon | 0.26–0.32 |
| Phosphorus | 0.020 |
| Sulfur | 0.012 |

SPECIAL CHARACTERISTICS (a) The arc starts easily and burns in a stable manner when correct conditions are employed.

(b) The coating melts uniformly and completely covers the bead as the metal of the electrode melts.

(c) Easy detachment of the slag.

(d) The beads are slightly curled and of very good appearance.

(e) Welding is possible in all positions including the descending vertical.

(f) It can be used with alternating or direct current, employing any polarity.

(g) Its penetration may be considered between low and medium depending on the current intensity employed.

(h) The deposited material has a low content of sulfur and phosphorus.

I claim:

1. A composition for coating of welding electrodes consisting essentially of, by weight, 6–20% cane bagasse, 10–15% potassic feldspar, 40–50% rutile concentrate, 8–12% calcium carbonate, 10–12% ferromanganese and 10–13% potassic mica, wherein the potassic feldspar has the following composition:

| $SiO_2$ | 65–75% |
|---|---|
| $Al_2O_3$ | 10–15% |
| $Fe_2O_3$ | 1–2% |
| CaO | 1–1.5% |
| $Na_2O$ | 4–10% |
| $K_2O$ | 4–12% |
| $TiO_2$ | 1–3% |

2. A welding electrode consisting of a steel rod coated with a composition consisting essentially of, by weight, 6–20% cane bagasse, 10–15% potassic feldspar, 40–50% rutile concentrate, 8–12% calcium carbonate, 10–12% ferromanganese and 10–13% potassic mica, wherein the potassic feldspar has the following composition:

| $SiO_2$ | 65–75% |
|---|---|
| $Al_2O_3$ | 10–15% |
| $Fe_2O_3$ | 1–2% |
| CaO | 1–1.5% |
| $Na_2O$ | 4–10% |
| $K_2O$ | 4–12% |
| $TiO_2$ | 1–3% |

* * * * *